United States Patent [19]
Lin

[11] Patent Number: 4,584,662

[45] Date of Patent: Apr. 22, 1986

[54] METHOD OF SIMULATING A SEMICONDUCTOR MOSFET

[76] Inventor: Hung C. Lin, 8 Schindler Ct., Silver Spring, Md. 20903

[21] Appl. No.: 666,351

[22] Filed: Oct. 30, 1984

Related U.S. Application Data

[63] Continuation-in-part of Ser. No. 410,309, Aug. 23, 1982, abandoned.

[51] Int. Cl.[4] ......................... G06G 7/62; G06G 7/48; G06F 7/00

[52] U.S. Cl. .................................... 364/802; 364/801; 364/300

[58] Field of Search ........ 364/578, 600, 602, 800–802, 364/807–808, 200 MS File, 300 MS File, 900 MS File; 357/41, 46; 324/73 R, 73 AT, 73 PC

[56] References Cited

U.S. PATENT DOCUMENTS

| | | | |
|---|---|---|---|
| 4,215,420 | 7/1980 | Kassakian | 364/802 |
| 4,293,916 | 10/1981 | Del Re et al. | 364/578 X |
| 4,333,157 | 6/1982 | Lee | 364/802 |
| 4,354,250 | 10/1982 | Lee | 364/802 |
| 4,364,116 | 12/1982 | Nossek | 364/802 X |
| 4,425,624 | 1/1984 | Planche | 364/802 |

*Primary Examiner*—Gary V. Harkcom

[57] ABSTRACT

A method of simulating the voltage-current characteristics of a short channel metal-oxide-semiconductor field effect transistor (MOSFET) by connecting a series of incremental MOSFETs of different threshold voltages. The threshold voltages near the source and the drain are reduced due to charge sharing. The substrate of each reduced threshold voltage incremental MOSFET is connected to its source. The reduction in threshold voltage can be obtained by Schwartz-Christoffel transformation of the depletion layer edges of the charge sharing region. From these threshold voltages one can calculate the incremental channel conductances and the voltage drops.

11 Claims, 11 Drawing Figures

METHOD OF SIMULATING A SEMICONDUCTOR MOSFET

This is a continuation-in-part of application Ser. No. 06/410,309 filed Aug. 23, 1982 now abandoned.

BACKGROUND OF THE INVENTION

In a large scale integrated circuits, metal-oxide-semiconductor field effect transistors or MOSFETS are integrated in a monolithic semiconductor substrate. The design and fabrication of a large scale integrated circuit is time consuming and costly. For cost-effectiveness, it is customary to simulate the circuit design with computer-aided analysis. How well the simulation can predict the performance depends on the accuracy of the models used in the simulation program. Since MOSFETS constitute the bulk of large scale integrated circuits, accurate modeling of the MOSFETS is the key in any simulation program.

In large scale integration, the channel length of MOSFET is scaled down to permit higher packing density. For short channel MOSFETs, the conventional one-dimensional analysis is not adequate to calculate the current voltage characteristics because of two-dimensional charge sharing effect at the source and drain junctions. Two-dimensional solution of the Poisson's equation is difficult to obtain analytically. Most investigators resort to numerical methods to attack the problem. Unfortunately, the progress is long and tedious, and impractical to be incorporated in a circuit analysis program. This invention presents a speedy method to simulate the characteristics of a short channel MOSFET, taking into account the two-dimensional effects.

SUMMARY OF THE INVENTION

An object of the present invention is to devise a method of simulating the characteristics of a semiconductor MOSFET. Another object of the present invention is to simulate the characteristics of a short channel semiconductor MOSFET taking into account two-dimensional charge sharing effect. Still another object of the present invention is to devise a means of calculating the change in threshold voltage along the channel of an MOSFET. A further object of the present invention is to accurately model a short channel MOSFET for such applications as the computer-aided analysis of integrated circuits.

These objects are achieved in the present invention by connecting in series a number of incremental MOSFETs, having different threshold voltages. Each threshold voltage is analytically obtained by linearizing the non-parallel, two-dimensional edges of the gate depletion layer and the junction depletion layer into a regular shape (such as a rectangle) using conformal mapping. The equidistant thickness of the linearized contour, (e.g. the rectangle) is transformed back to the original plane to determine the distance between the non-parallel contours of the charge sharing region. This distance is proportional to the decrease in threshold voltage. Once the threshold voltage from point to point is known, the incremental channel conductance can be found. Then the current voltage characteristic can be obtained.

DETAILED DESCRIPTION OF THE DRAWINGS

Figure 1:
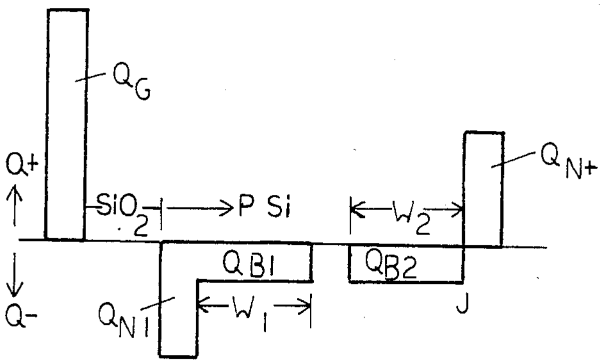
FIG. 1 shows the charge distribution of an MOS structure at strong inversion.

In an MOS structure the threshold voltage is defined as the gate voltage required to induce strong inversion. A one-dimensional charge distribution for a p-type background is depicted in FIG. 1. The gate voltage must be capable of inducing an inversion layer $Q_{N1}$ and a depletion layer $W_1$ at strong inversion.

Figure 2A:
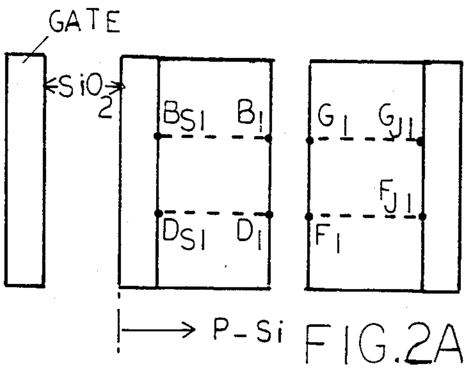
FIG. 2A shows the charge distribution when two depletion layers do not overlap.
Figure 2B:
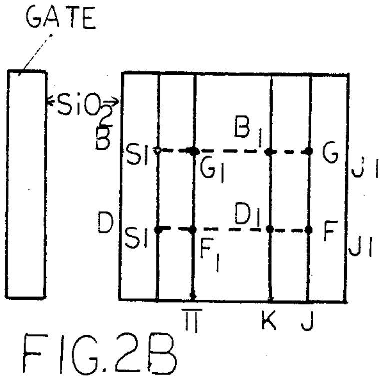
FIG. 2B shows the charge sharing effect when two depletion layers overlap in one dimension.

When an N+P junction J is placed far away at the back of the p-type background (as in the case of a buried channel Charge Coupled Device), the situation is depicted in the lower part of FIGS. 1 and 2(A). Note that the back junction induces a depletion layer $W_2$. The electric field lines such as $B_{S1}B_1$ and $D_{s1}D_1$ are equal to $W_1$; $F_{j1}F_1$ and $G_{j1}G_1$, equal to $W_2$. The threshold voltage is unaffected by the presence of the back junction for this condition. However, when the back junction is placed closer to the surface, the two depletion layers overlap. Now the back junction shares some charge in the depletion layer as shown in FIG. 2(B). The gate is no longer required to induce as much charge as in FIG. 1 or 2(A) for the same amount of inversion layer charge. Thus the threshold voltage is reduced. Using the depletion approximation, the reduction in threshold voltage $\Delta V_T$ is proportional to the amount of shared charge Q, which is proportional to the distance $S_1$ between the edges $B_1D_1$ and $F_1G_1$ of the depletion regions $W_1$ and $W_2$ in FIG. 2(B). Analytically, $$\Delta V_T = \frac{Q}{C_{OX}} = \frac{QN_AS_1}{C_{OX}} \quad (1)$$

where $N_A$ is the background impurity concentration and $C_{OX}$ is the gate oxide capacitance per unit area.

When the gate and the back junction are parallel to each other along the length of the MOS structure, the charge sharing region is a rectangle bounded by lines $\pi$ and K as shown in FIG. 2(B) in a plane referred to as $Z_1$. The threshold voltage at every point along the length of the gate is the same, because the thickness $S_1$ such as $F_1G_1$ or $D_1F_1$ of the charge sharing rectangular region is the same. The quantity $\Delta V_T$ is represented by the thickness of the charge sharing region. When $\Delta V_T$ is differentiated with respect to the distance between the depletion layer edges, the derivative is $d(\Delta V_T)/dX_1 = \Delta V_T/S_1$. Conversely one can find $S_1$ if we know the derivative.

$$S_1 = \frac{\Delta V_T}{d(\Delta V_T)/dX_1} \quad (2)$$

The derivative $d(\Delta V_T)/dX_1$ has the dimension of an electric field and is constant for a uniform background concentration $N_A$.

$$d(\Delta V_T)/dX_1 = qN_A/C_{OX} \quad (3)$$

Mathematically, a constant derivative implies that the function is analytic. For an analytic function one can use conformal mapping to change the shape of the charge sharing region.

Figure 3:
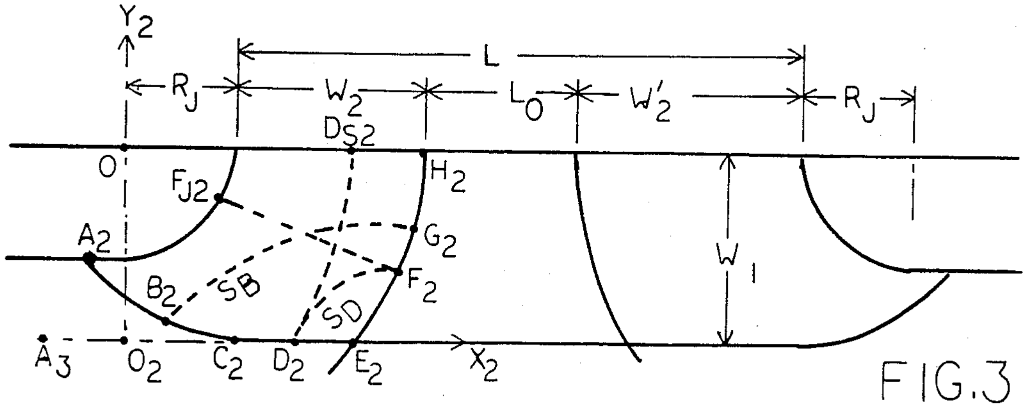
FIG. 3 shows the cross-section view of the charge sharing effect in two dimensions.

In an actual MOSFET, the back junction is the source and drain diffusion. The cross section view of the MOSFET is shown in FIG. 3 and referred to as $Z_2$ plane. In this structure, the source junction has a depth $R_J$ and assumes a circular shape. The boundary of the depletion layer of the source junction $E_2F_2G_2H_2$ is concentric with the junction contour but the radius is larger by a length $W_2$. The boundary of the depletion layer induced by the gate is away from the inversion layer (usually very thin and hence not shown) by a depth $W_2$. The boundary $A_2B_2C_2D_2E_2$ has two sections: Section $A_2B_2C_2$ describes an arc with radius $W_1$ which intersects with the junction at a point $A_1$; Section $C_2D_2E_2$ is a straight line parallel to the gate.

Note that the section $A_2B_2D_2$ in FIG. 3 corresponds to the section $A_1B_1D_1$ in FIG. 2 and section $F_2G_2H_2$ corresponds to section $F_1G_1H_1$ in FIG. 2. However, due to the non-parallel surfaces of $A_2B_2C_2$ and $E_2F_2G_2H_2$ the field line $S_D$ from $D_2$ to $F_2$ and the field line $S_B$ from $B_2$ to $G_2$ are unequal in length. Thus the corresponding decrease in threshold voltage are also unequal because $\Delta V_T$ is proportional to the shared charge region thickness as given by Eq. (1).

The path $D_{S2}D_2F_2F_{2J}$ in FIG. 3 corresponds to the path $D_{S1}D_1F_1F_{IJ}$ in the parallel plate geometry in FIG. 2(B). It should be pointed out that for every point such as $D_2$, there is a corresponding point $D_{2S}$ at the surface along the same path. It is at this point $D_{S2}$ that the threshold voltage is reduced by $\Delta V_T = qN_AS_D/C_{OX}$.

From FIG. 3, it can be seen that $S_B$, which terminates at a point $B_{S2}$, is longer than $S_D$, which terminates at $D_{S2}$. Thus the reduction in threshold voltage at $B_{S2}$, which is closer to the junction than $D_{S2}$, is larger than that at $D_{S2}$. The reduction in threshold voltage is largest near the junction and tapers off as the distance from the junction increases.

The shared charge region length such as $S_B$ in FIG. 3 is curvalinear. To linearize its length, one can utilize the Schwartz-Christoffel Transformation. Such a transformation is permissible since the function $\Delta V_T$ in Eq. (1) is analytic.

The sections $C_2D_2E_2$ and $E_2F_2G_2H_2$ in the $Z_2$ plane of FIG. 3 can be linearized into two parallel plates $A_1B_1D_1$ and $F_1G_1H_1$ as shown in FIG. 2(B) using the following Schwartz-Christoffel Transformation $$Z_1 = \ln\frac{Z_2 - 1}{Z_2 + 1} \quad (4)$$

It should be pointed out that $Z_1$ and $Z_2$ are normalized dimensions, with $O_2E_2$ in the $Z_2$ plane normalized to unity and the distance $O\,O_2$ equal to cot K. After transformation, the distance between the two parallel plates $A_1B_1D_1$ and $F_1G_1H_1$ is $\pi - K$. If a voltage V is applied across these plates, the normalized electric field is $$\frac{dV}{dZ_1} = \frac{V}{\pi - K} \quad (5)$$

In the $Z_2$ plane, the length of a field line $S_D$ is equal to $$S_D = \left|\frac{V}{dV/dZ_2}\right| = \left|\frac{V}{(dV/dZ_1)\,(dZ_1/dZ_2)}\right| \quad (6)$$

By differentiating Eq. (4), one obtains along $Y_2$ axis $$\frac{dZ_1}{dZ_2} = \frac{2}{Z_2^2 - 1} \quad (7)$$

From Eqs. (5), (6), (7)

$$S_D = \frac{(X_2^2 - 1)(\pi - K)}{2} \quad (8)$$

The section $A_2B_2C_2$ in the $Z_2$ plane is an arc, but can be linearized into a straight line along the $X_2$ axis by another transformation $$Z_0 - Z_3 = \frac{(1 - Z_2)i}{1 + Z_2} \quad (9)$$

The length of a field line such as $S_B$ between $B_2$ and $G_2$ can be obtained from the relationship $$S_B = \left|\frac{V}{\frac{dV}{dZ_1}\,\frac{dZ_1}{dZ_3}\,\frac{dZ_3}{dZ_2}}\right| = \frac{(X_2^2 - 1)\,(\pi - k)}{2(X_2^2 + 1)} \quad (10)$$

In this latter transformation the point $A_2$ in the $Z_2$ plane is transformed into point $A_3$ in a $Z_3$ plane. The location $A_3$ with respect to $O_2$ is $X_{2m}$ $$X_{2m} = X_{2O} - \frac{2\sin\theta}{1 + 2\cos\theta} \quad (11)$$

where $X_{20} = AR_J$ [A is defined in Eq. (16)]

$$\theta = \arcsin\,(R_J/D_1) \text{ for } R_J < D_1/\sqrt{2} \quad (12a)$$

$$\theta = \arccos\,(D_1/2R_J) \text{ for } R_J > D_1/\sqrt{2} \quad (12b)$$

Figure 4:
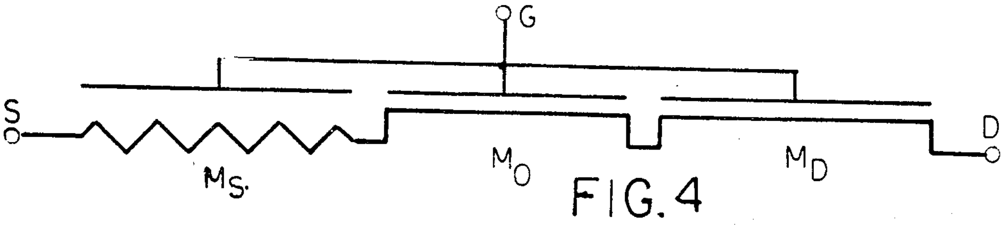
FIG. 4 shows a model of an MOSFET based on the present invention.

A short channel MOSFET can be divided into three different sections according to charge sharing effect as shown in FIG. 4. The first section $M_S$ is the region where there is charge sharing between the gate depletion layer and the source depletion layer. In this section, the threshold voltage varies from the lowest value next to the source junction to a maximum value at a point where the source depletion layer ends. Because this section has lower threshold voltages, the channel conductance is high and the characteristic is essentially ohmic.

The section $M_D$ near the drain is another shared charge region, where drain junction depletion layer merges with the gate depletion layer. The threshold voltage varies from a minimum next to the drain junction to a maximum toward the center of the gate. The V-I characteristic of this section is more nonlinear than $M_S$ section because a higher drain voltage tends to pinch off the channel near the drain.

In the middle section $M_O$, there is no charge sharing effect. The transistor behaves like a regular MOSFET. However the channel length of this section is shortened by the shared charge regions near the source and the drain.

Thus a short channel MOSFET can be modeled as a three section device as shown in FIG. 4.—an ohmic section at the source end, a conventional MOSFET at the middle with shortened channel length, and a variable threshold voltage section at the drain end.

The general voltage increment along a channel can be expressed as $$dV = \frac{IdX}{\mu C_{OX} W(V_{GS} - V_T - V)} \quad (13)$$

where $\mu$ is the mobility, $C_{OX}$ is the gate oxide capacitance per unit area, W is the channel width and $V_T$ is the threshold voltage and is reduced at the shared charge regions.

$$V_T = V_{TO} - \Delta V_T \quad (14)$$

where $V_{TO}$ is the threshold voltage in the absence of charge sharing effect.

Consider first the $M_S$ section. The threshold voltage reduction along the arc $A_2B_2C_2$ in FIG. 3 is obtained from Eqs. (1) and (8)

$$\Delta V_T = \frac{qN_A(\pi - K)(X_2^2 - 1)}{4A\, C_{OX}(X_2^2 + 1)} \quad (15)$$

where A is a normalizing factor $$A = \csc K/(R_J + W_2) \quad (16)$$

In the $M_S$ section, the voltage drop is small and V can be neglected. Integration can most conveniently proceed along $A_3'B_2C_2$.

$$\frac{V}{I} = R_{S1} = \int_{X_{2m}}^{X_{2O}} \frac{dX_2}{A\, C_{OX} W(V_G - V_{TO} - \Delta V_T)} = \quad (17)$$

$$\frac{1}{\mu C_{OX} W(\beta - V_O)} \left\{ X_{O2} - X_{2m} + \frac{1}{\beta - V_O}\left[ P \ln \frac{(X_{2O} - \alpha + \gamma)}{(X_{2m} - \alpha + \gamma)} + \phi \ln \frac{(X_{2O} - \alpha - \gamma)}{(X_{2m} - \alpha - \gamma)} \right] \right\}$$

where $$P = \frac{V_O}{\alpha\gamma}[X^2 + 2 + 2X_{2O}(\alpha - \gamma)]$$

$$\phi = 2V_O X_{O2} - P$$

$$\beta = V_G - V_T$$

$$\alpha = \beta X_{2O}/(\beta - V_O)$$

-continued $$\gamma = \frac{(V_O^2 + \beta V_O X_{2O}^2 - \beta^2)^{\frac{1}{2}}}{\beta - V_O}$$

$$V_O = \frac{qN_A(\pi - K)}{2A\, C_{OX}}$$

For the line $C_2D_2E_2$, $\Delta V_T$ is given in Eq. (8).

$$R_{S2} = \frac{V}{I} = \int_{X_{2O}}^{1} \frac{dX_2}{A\, C_{OX} W(V_G - V_{TO} - \Delta V_T)} \quad (18)$$

$$= \frac{1}{2V_O \mu W C_{OX} HA} \ln\left[ \frac{(H - 1)}{(H + 1)} \cdot \frac{(H + X_{2O})}{(H - X_{2O})} \right]$$

where $H = (V_{GS} - V_{TO} + V_O)^{\frac{1}{2}}$

For the middle section $M_O$, we can use the conventional characteristic equation for $V_{DS}$. Let $V_1 = I(R_{S1} + R_{S2})$ $$V_2 = V_G - V_{TO} - [(V_G - V_1 - V_{RO})^2 - 2L'I/\mu C_{OX} W]^{\frac{1}{2}} \quad (19)$$

The effective channel length is the difference between the metallurgical length and the depletion layers at the drain and the source as shown in FIG. 3

$$L' = L - W_2 - W_2' \quad (20)$$

For the section $M_D$ near the drain, the situation is similar to that at the source. However, the voltage V in the denominator of Eq. (13) cannot be neglected, because the drain voltage can be substantial. The set of equations corresponding to that used for the source section are as follows with symbols primed (')

$$D' = (2\epsilon/qN_A)^{\frac{1}{2}}(2\phi_F + V_{DS} + V_{BS})^{\frac{1}{2}} \quad (21)$$

$$\cos K' = W_1/W_2' + R_J) \quad (22)$$

$$A' = \csc K/(R_J + W_2') \quad (23)$$

$$X'_{2m} = \frac{1 - 2W_1 A \sin\theta}{1 + 2\cos\theta} \quad (24)$$

$$\Delta V_{T1} = \frac{qN_A(\pi - K)(X_2'^2 - 1)}{4AC_{OX}} \quad (25)$$

$$\Delta V_{T2} = \frac{qN_A(\pi - K)(X_2'^2 - 1)}{2WAC_{OX}(1 - X'_{O2} - X_2')^2} \quad (26)$$

$$V_{31} = \int_{1}^{X_{O2}} \frac{I_D dX}{\mu C_{OX} W(V_G - V_{TO} - \Delta V_{T1} - V)} \quad (27)$$

$$V_{32} = \int_{X_{O2}}^{X_{2m}} \frac{I_D dX}{\mu C_{OX} W(V_G - V_{TO} - V_{T2} V)} \quad (28)$$

The summation of the voltage drops across each section is the total drain-to-source voltage.

$$V_{DS} = I_D(R_{S1} + R_{S2}) + V_2 + V_{31} + V_{32} \quad (29)$$

Thus for any assigned value of $I_D$, there is a corresponding $V_{DS}$.

Figure 5A:
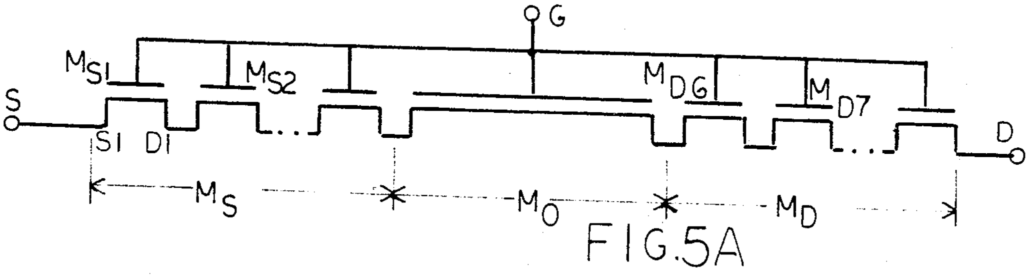
FIG. 5A shows the circuit connecting a number of MOSFETs in series according to the present invention.

Each of the charge sharing sections, $M_S$ and $M_D$, can further be broken up into a number of incremental MOSFETs as shown in FIG. 5(A). Each incremental MOSFET such as $M_{S1}$, $M_{S2}$ etc. has a different threshold voltage as given in equations (15), (25) and (26). The incremental drain to source voltage drops dV are given by equation (13). The total drain to source voltage is simply the summation of these incremental drops.

In this circuit, a number of incremental MOSFETs such as $M_{S1}$, $M_{S2}$ . . . etc. and $M_{D6}$, $M_{D7}$ . . . etc. and connected in series. Each incremental MOSFET has a drain, a gate a source and a background. For instance, the incremental MOSFET $M_{S1}$ has a corresponding drain D1, a source S1, a gate G1 and a background B1. In the series connection, the drain of $M_{S1}$ is connected to the source of $M_{S2}$; the drain of $M_{S2}$ is connected to the source of next incremental MOSFET and so forth. The gates of all the incremental MOSFETs are connected together. Similarly the drain section $M_D$ also consists of a number of incremental MOSFETs $M_{D6}$, $M_{D7}$ . . . in series.

Figure 5B:
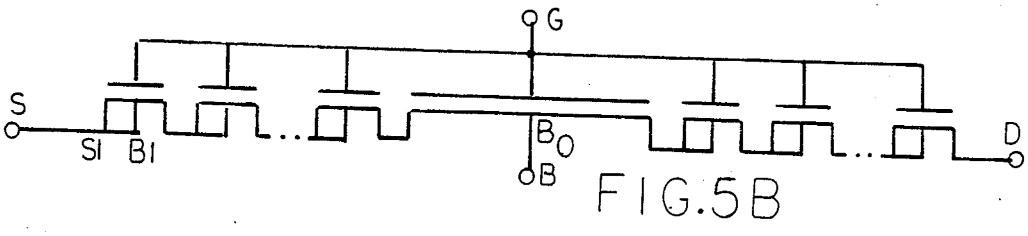
FIG. 5B shows another version of connecting a number of MOSFETs in series with respective substrate connections indicated.

For simplicity the background of each incremental MOSFET is connected to its respective source, eg. S1 connected to B1 as shown in FIG. 5(*b*). Only the middle section $M_O$ has its background $B_O$ connected to the substrate B. The substrate B is connected to an external terminal, where an external voltage $V_{BS}$ can be applied to vary the threshold voltage of $M_O$ as is well-known in the art. When the external substrate bias is increased, the depletion layer charge such as $Q_{B1}$ in FIG. 1 is increased. Therefore, the threshold voltage of $M_O$ can be increased by increasing $V_{BS}$.

Figure 6A:
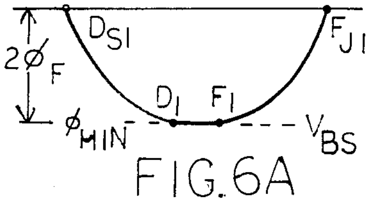
FIG. 6A shows the potential distribution when two depletion layers do not overlap.
Figure 6B:
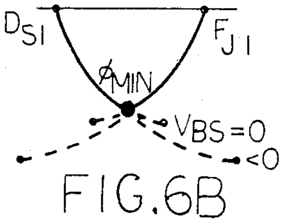
FIG. 6B shows the potential distribution when two depletion layers overlap.

The reason for connecting the source and the background for each incremental MOSFET can be understood from FIG. 6(A) and FIG. 6(B), which are potential distribution diagrams corresponding to the charge distribution depicted in FIG. 2(A) and FIG. 2(B). The potential distribution corresponding to the non-overlapping charge distribution depicted in FIG. 2(A) and FIG. 2(B). The potential distribution corresponding to the non-overlapping charge distribution depicted in FIG. 2(A) is shown in FIG. 6(A). The left-hand side corresponds to the oxide-semiconductor interface and the potential varies from $2\phi_F$, which is the surface potential to cause strong inversion and corresponds to the potential at $D_{S1}$ or $B_{S1}$ in FIG. 2(A), down to the substrate potential $V_{BS}$. This substrate potential corresponds to the potential at $D_1$ or $B_1$ in FIG. 2(A), which is also the minimum potential $\phi_{min}$. The right hand side corresponds to the back junction and the potential varies from a potential $\phi_j$ down to $V_{BS}$ at $F_1$ or $G_1$.

The potential distribution corresponding to the overlapping charge distribution in FIG. 2(B) is shown in FIG. 6(B). The potential distributions, shown in dotted lines due to the gate voltage and the back junction, are similar to that in FIG. 6(A). However the combined potential distribution as shown in solid line has a potential minimum $\phi_{min}$ where the two individual potential distributions meet. This minimum potential is above the substrate potential $V_{BS}$ at $\phi_{F1}$ and $\phi_{D1}$. As $V_{BS}$ is decreased from say 0 to $-V_{BS}$, the tail of the individual potential extends to a lower level but the intersecting point $\phi_{min}$ is essentially unchanged. In other words, the minimum potential is insensitive to the substrate bias. For this reason, the source and the background of any incremental MOSFET can be connected together.

The characteristics of the series incremental transistor shown in FIG. 5 can readily be simulated with computer-aids. The incremental voltage drop is given in Eq. (13). The voltage in the denominator of Eq. (13) is the sum of the incremental voltage drops up to a particular point X starting from the source.

Figure 7:
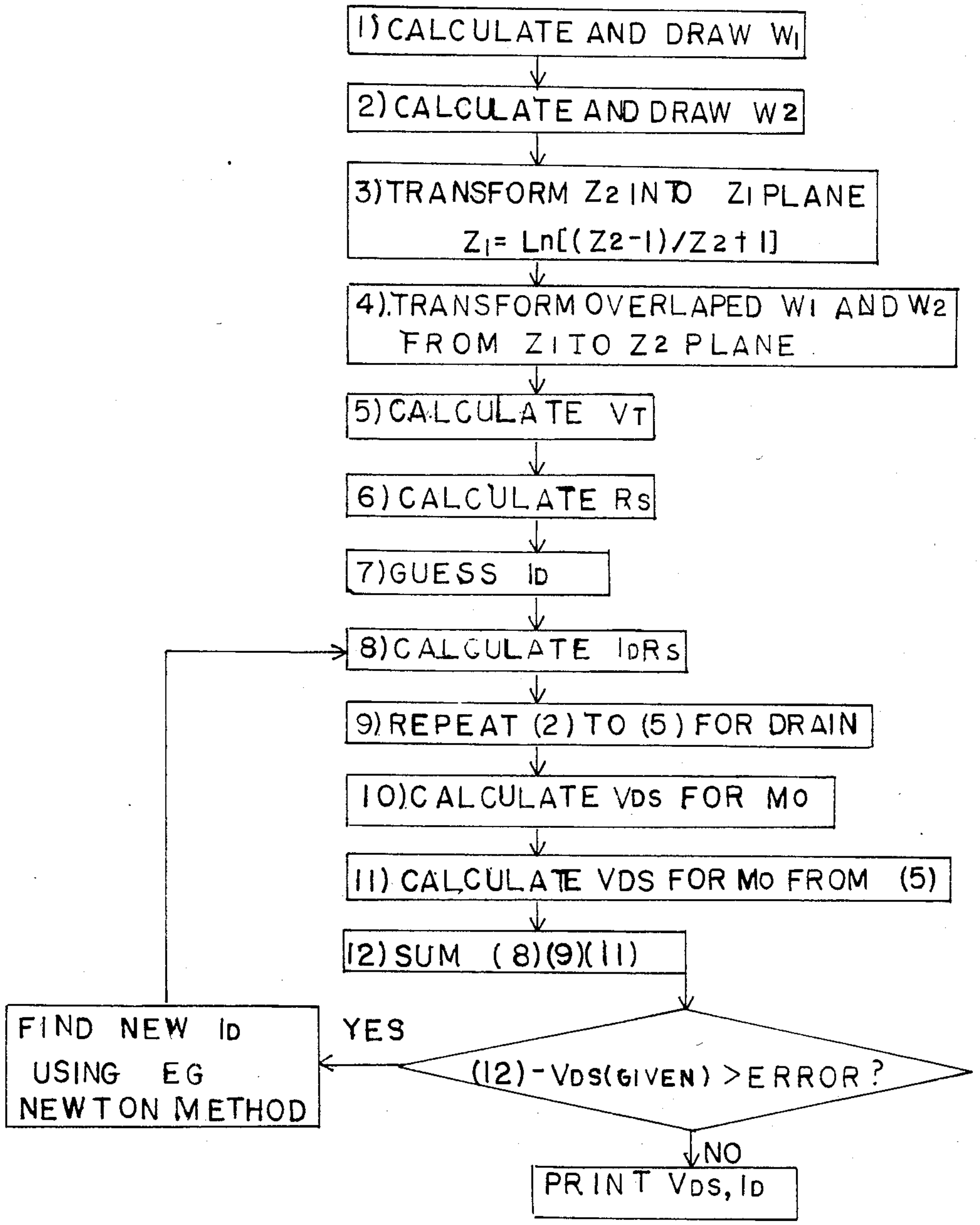
FIG. 7 is a flow-chart showing how the present invention can be implemented with a computer or calculator to simulate the characteristics of an MOSFET.

The foregoing description can readily be applied to a computer of a handheld calculator to find the voltage-current relationship of a short channel MOSFET. A possible programming flow chart is shown in FIG. 7, which is also a summary of this new method. Iterative numerical methods such as Newton's method, bisection method or regula-falsi method may be used to find the drain current.

Figure 8:
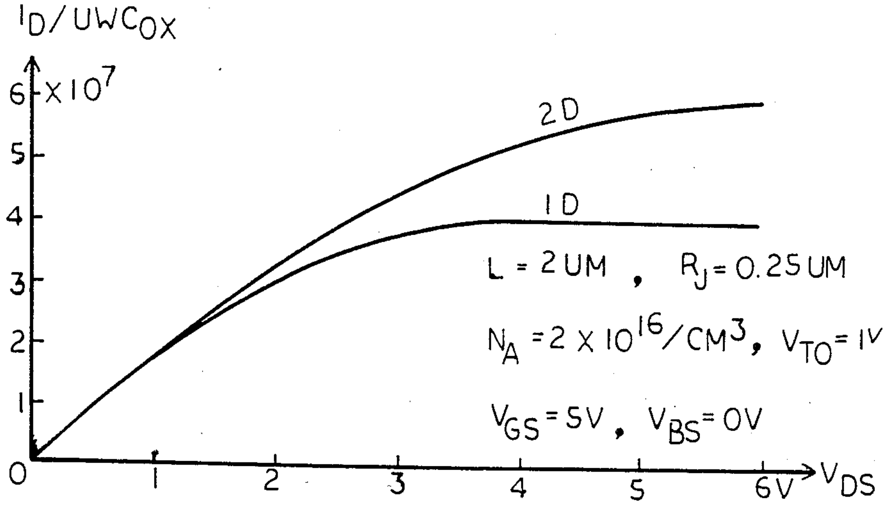
FIG. 8 is a sample simulation of an MOSFET characteristic using the present invention.

A sample calculation of V-I characteristics is shown in FIG. 8 as curve 2D. Also plotted on the same graph as curve 1D is the characteristic using the classical one-dimensional equation. Note that the 2D curve described here yields a substantially higher drain current than the 1D curve and is not saturating. This is in agreement with experimental results many investigators observed.

While FIG. 3 describes a particular shape of MOSFET, this linearizing transformation technique is not limited to this geometry. The Schwartz-Christoffel transformation can be applied to a variety of two-dimensional geometries and linearize them into rectangular configuration.

Note also that the reduction in threshold voltage, as calculated from Eqs. (8) and (10), are functions of $X_2$ and $Z_2$ plane. Thus one can generalize by stating that the change in threshold voltage can be expressed as a function of $X_2$.

I claim:

1. Method of simulating the characteristics of a short-channel metal-oxide-semiconductor field effect transistor (MOSFET) having a gate, a source, a drain and a substrate comprising steps of connecting a number of incremental MOSFET's in series, connecting the drain of each said incremental MOSFET to the source of next said incremental MOSFET, the first and last incremental MOSFETs of said series having lower threshold voltages than other incremental MOSFETs, connecting the source of said first incremental MOSFET to a source voltage, connecting the drain of said last incremental MOSFET to a drain voltage, connecting the gates of all said incremental MOSFETs together to form a common gate, connecting a gate voltage to said common gate to a gate voltage to cause current flow from the drain to the source of each said incremental MOSFET when a drain voltage is connected between the drain of said last incremental MOSFET and the source of the said first incremental MOSFET.

2. Method of simulating the characteristics of a MOSFET as described in claim 1 comprising further steps of connecting the substrate of each said incremental MOSFET with lower threshold voltage to said respective source, connecting the substrate of said incremental MOSFET whose threshold voltage is not lowered to an external bias.

3. A method of simulating the characteristics of a MOSFET as described in claim 1 wherein said current is derived by measurement.

4. A method of simulating the characteristics of a semiconductor MOSFET as described in claim 1, wherein said current is derived by computation from the characteristic equation of each said incremental MOSFET.

5. A method of simulating the characteristics of a semiconductor MOSFET as described in claim 4 wherein said computation comprises the steps of calculating the reduction in threshold voltages at different points along the channel of said short channel MOSFET due to sharing of depletion layer charge induced by the gate and the depletion layer charge induced by the source or the drain, and calculating incremental channel conductance corresponding to said threshold voltage.

6. A method of simulating that characteristics of a MOSFET as described in claim 5, wherein said incremental channel conductance is multiplied by an assigned drain current to obtain incremental voltage drop along said channel and said incremental voltage drops are summed to obtain a total drain to source voltage.

7. A method of simulating the characteristics of a MOSFET as described in claim 5, wherein said reduction in threshold voltage is calculated by steps of: drawing a first contour of depletion layer edge induced by said gate voltage in a cross-sectional plane of said short channel MOSFET, drawing a second contour of depletion layer edge of either the source junction or the drain junction, transforming two said contours into parallel surfaces using conformal mapping, transforming equal spacing between said parallel surfaces back to unequal distances in the original plane along said first contour, calculating reduction in threshold voltage of the MOSFET proportional to said unequal distances.

8. A method of simulating the characteristics of a semiconductor MOSFET as described in claim 7, wherein said second contour describes an arc of a circle, said first contour is spoon-shaped with a straight portion forming a section of a chord and a curve portion concentric with the junction edge at the semiconductor surface.

9. A method of simulating the characteristics of a semiconductor MOSFET as described in claim 8, wherein said conformal mapping for said second contour and the straight line portion of said first contour uses the Schwartz-Christoffel transformation: $Z_1=\ln[(Z_2-1)(Z_2+1)]$, and the conformal mapping for said straight portion and said curved portion of first contour uses the Schwartz-Christoffel transformation:

$$Z_O-Z_3=(1-Z_2)i/(1+Z_2)$$

where $Z_1$ is the coordinate of said original plane, $Z_3$ is the coordinate of said transformed plane, and $Z_2$ is the coordinate of the plane of said curved portion, and $Z_O$ is a translation constant.

10. A method of simulating the characteristic of a semiconductor MOSFET as described in claim 8, wherein said reduction in threshold voltage in the straight line portion of said first contour is proportional to $(X_2^2-1)$, where $X_2$ is a normalized distance from center of said circle in a direction parallel to said straight line, and said reduction in threshold voltage in the curved portion of said first contour is proportional to $(X_2^2-1)/(X_2^2+1)$.

11. A method of simulating the characteristics of a semiconductor MOSFET as described in claim 7, wherein said incremental conductance near the source junction is integrated into a single ohmic conductance.

* * * * *